May 29, 1923.
G. J. CARTER ET AL
1,457,019
INTERNAL COMBUSTION ENGINE
Filed Oct. 22, 1918    3 Sheets-Sheet 1
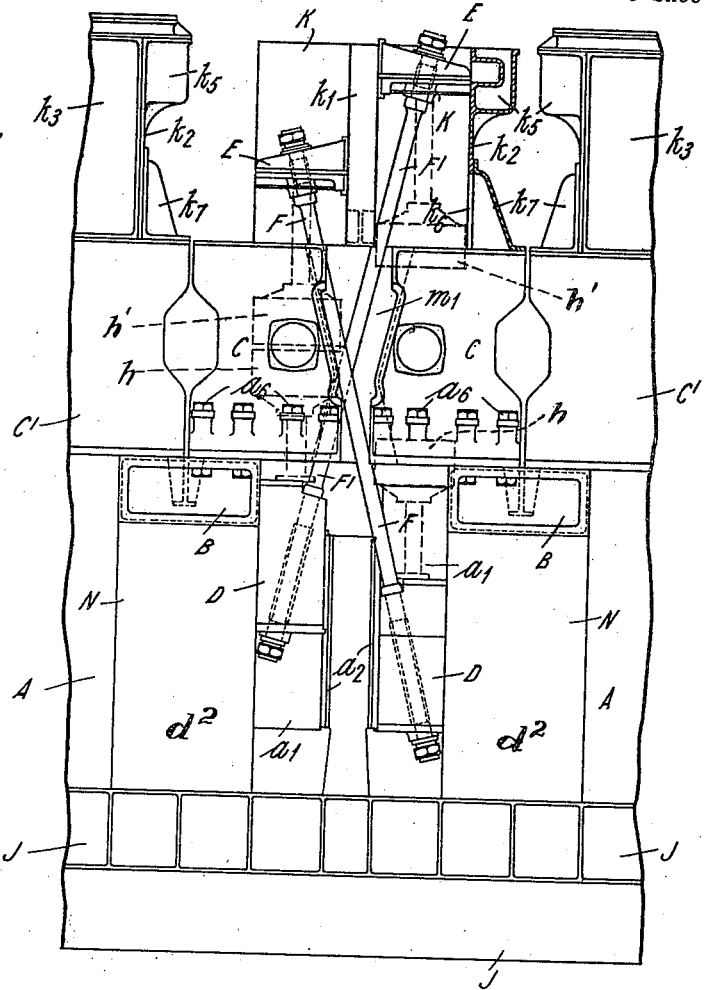
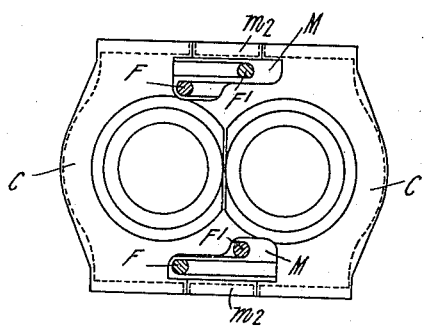

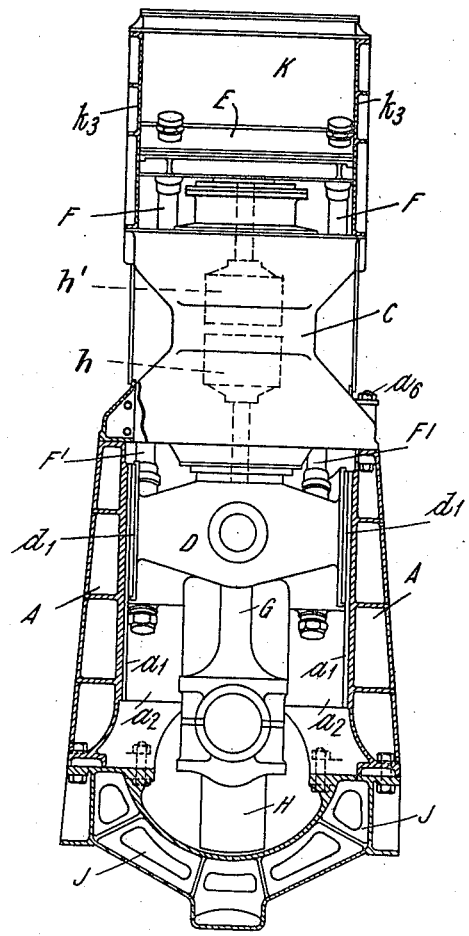

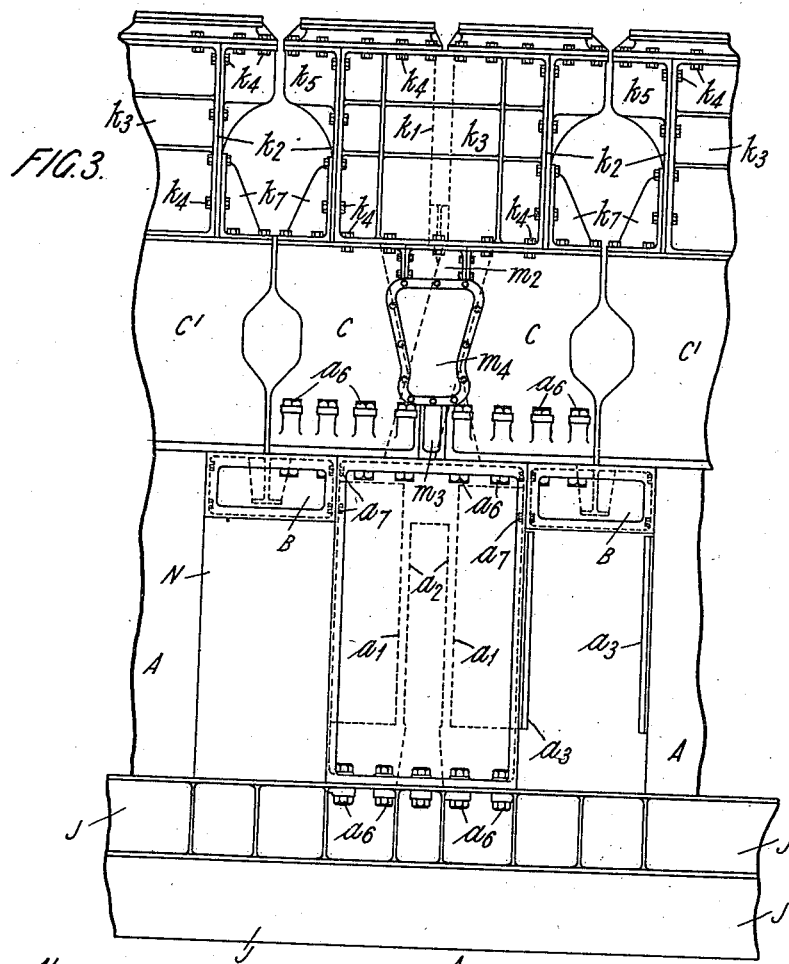
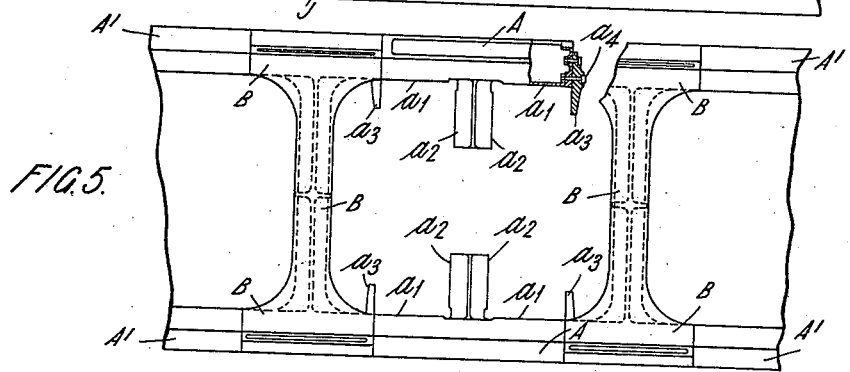

Patented May 29, 1923.

1,457,019

UNITED STATES PATENT OFFICE.

GEORGE J. CARTER, OF BROMBOROUGH, AND LAUCHLAN GRANT McFARLANE, OF LIVERPOOL, ENGLAND.

INTERNAL-COMBUSTION ENGINE.

Application filed October 22, 1918. Serial No. 259,252.

*To all whom it may concern:*

Be it known that we, Sir GEORGE JOHN CARTER, a subject of the King of Great Britain, residing in Bromborough, in the county of Chester, England, and LAUCHLAN GRANT McFARLANE, a subject of the King of Great Britain, residing in Liverpool, in the county of Lancaster, England, have invented certain new and useful Improvements in Internal-Combustion Engines, of which the following is a specification.

This invention relates to internal combustion engines of that class in which each unit comprises a pair of open-ended cylinders each provided with two oppositely moving pistons, the upper piston of the one cylinder and the lower piston of the other being in each case respectively connected by cross rods through a cross-head and connecting rod to the one crank of a pair of cranks; and the invention has reference particularly to the design of vertical engines of this class suitable for submarines and the like applications where the head-room is so limited that the ceiling is close to the top of the engine structure; and the object of the present invention is to so construct the engine framing and cylinders that the crossed rods may be dismantled for inspection and repair by being withdrawn laterally and so that by the removal of comparatively wide enclosing plates access may be obtained to the cross-heads, slides and connecting-rod ends, and so that a column with its guides may be withdrawn to expose the working parts without disturbing the cylinders. This is effected by making the clearance spaces in the main cylinder castings for the crossed rods with through gaps of suitable shape and provided with facings to take making-up frames which when bolted in position restore continuity and strength, and by so constructing the outer guide plates for the upper cross-heads that these may be removed so as to permit the axial withdrawal in an oblique direction of the crossed rods from the main cross-head, which is necessary prior to their lateral removal through the gaps.

The main frame for a multi-cylinder engine is built-up of pairs of columns located on opposite sides of the crank shaft symmetrically under the respective two-cylinder unit castings, and of horizontal H shaped transverse frames lying under the adjacent portions of two such units and over the main bearings and rigidly bolted to the two adjacent cylinder castings and to adjacent pairs of columns, the arrangement being such that wide access spaces, nearly the full depth of the columns are provided between the columns, which spaces are closed-in by detachable plates, and such that any of the columns may be removed without disturbing the cylinders, each of the columns being arranged to carry a pair of main guides to take the main connecting rod thrusts on the one side, a pair of guide surfaces to take on the same side, the thrust of the lower ends of the two pairs of crossed rods when the latter are in tension, and also, on the same side, a pair of guides to take the thrust of the lower ends of the said rods should they at any time be in compression; each of these guides, the cross-heads and the corresponding slippers, and the connecting rods may therefore be exposed for inspection and repair, and in addition to possessing these advantages the arrangement is one which greatly facilitates the manufacture and erection of the engine.

The invention as applied to a multiple cylinder engine for a submarine, or the like application, in which the head room is strictly limited, is illustrated in the accompanying drawings, in which:—

Fig. 1 is a side elevation with the near column, the making-up frames and the enclosing plates removed.

Fig. 2 is an end elevation with the bedplate and columns shown partly in transverse section.

Fig. 3 is a side elevation similar to Fig. 1 but showing in position the parts omitted from the latter view.

Fig. 4 is a plan view with the parts above the cylinders removed, and

Fig. 5 is a plan view of the main frames with cylinders removed.

A are the main columns, B the transverse frames, C the main cylinder casting, D the main cross-heads connected to the respective lower pistons $h$, and E the upper cross-heads connected to the respective upper pistons $h'$. F, F, and F', F', are the pairs of crossed rods which respectively connect the cross-heads D to the cross-heads E; G are the main connecting rods connecting the cross-heads D to the respective cranks H, and J is the bed-plate which carries the crank shaft bearings and the feet of the columns.

The cross-heads E are of rectangular configuration and form pistons working in chambers K of rectangular cross-section, and the central guide wall $k^1$ of this chamber takes the thrust of the cross-heads E when the crossed rods are in tension, the side guide walls $k^2$ (see the right hand side of Fig. 1) taking the thrusts should the said rods, due to any cause, be in compression; the walls $k^2$ and $k^3$ of the chamber K are detachable and are secured in place by bolts or studs $k^4$.

The side guide walls $k^2$ are shaped so as to form at the upper ends valve chambers $k^5$ and at the bottom they are provided with inspection openings $k^6$ which openings are closed by angle cover plates $k^7$ which also serve to strengthen the guide walls $k^2$. The wall $k^2$ and cover plate $k^7$ are shown removed on the left hand side of Fig. 1.

M are the clearance recesses for the crossed rods F and F'; these recesses are provided with gaps $m^1$ (see Fig. 1) shaped preferably as shown, through which gaps the crossed rods F, F, and F' F', may be withdrawn laterally after they have been withdrawn from the main cross-head D by oblique axial movement which is permitted by the removal of the guide walls $k^2$ of the chamber K. The gap is normally closed by upper and lower making-up frames $m^2$ and $m^3$, secured in position by studs or bolts so as to restore strength and continuity to the cylinder casting, the gap is further closed by a cover plate $m^4$.

The main columns A carry main guides $a^1$ to take the connecting rod thrusts on the cross-head slipper plates $d^1$ and also carry auxiliary guides $a^2$ to take the horizontal component on the slipper plates $d^2$ of the oblique forces transmitted by the crossed rods when the latter are in tension; and may also be provided with guides $a^3$ (see Fig. 5) detachably secured by bolts or studs $a^4$ which take the like horizontal components when the said rods are in compression. The columns A are bolted by bolts $a^5$ to the cylinder casting and bed-plate, and the transverse frames are bolted by bolts $a^6$ to the cylinder casting and by bolts $a^7$ to the columns A.

An engine is built up of a number of unit sections as described according to the power required, the transverse frames being bolted to the adjacent columns A' and cylinder castings C'. The access spaces between the columns are closed-in by plates N, and the access usually necessary may be obtained through these spaces, the guides $a^3$ being removed; additional access and exposure of working parts may, as stated, be obtained by the removal of any one of the column members, the main cylinder casting being then adequately supported and retained in alignment by the remaining columns and the transverse frames.

Having now particularly described and ascertained the nature of our said invention, and in what manner the same is to be performed, we declare that what we claim is:—

1. In a multiple cylinder marine type engine, a main cylinder casting including a pair of vertical cylinders, a pair of oppositely moving pistons in each cylinder, a crank shaft beneath said cylinder casting to which the lower pistons are connected, upper and lower pairs of cross heads connected respectively to the upper and lower pistons, upper and lower pairs of guides for said cross heads, two pairs of obliquely crossed rods connecting the upper cross heads of one cylinder with the lower cross heads of the other cylinder respectively, the outer guides for the upper cross heads being removable and the cylinder casting having clearance recesses for the cross rods, said recesses being provided with gaps whereby said crossed rods may be withdrawn laterally without dismantling the working parts.

2. In a multiple cylinder engine according to claim 1, a cylinder casting, and a plurality of columns and transverse frames supporting the casting, the columns being individually removable from the cylinder casting and frames.

3. A multiple cylinder engine according to claim 1, having a plurality of removable columns and transverse frames supporting the cylinder casting, said columns having main and auxiliary guide surfaces, for the lower cross heads, mounted thereon and removable therewith.

4. A multiple cylinder engine according to claim 1, having a plurality of columns and transverse frames supporting the cylinder castings, said columns being removable and having main guides $a'$, on the inner faces of the columns, projecting guides $a^2$, at the middle of the columns, and projecting guides $a^3$ at the ends of the columns, said guides being for the guidance of the lower cross heads.

In witness whereof we have set our hands in presence of two witnesses.

GEO. J. CARTER.
LAUCHLAN GRANT McFARLANE.

Witnesses:
J. E. FORD BARNES,
JOSEPH E. HERROL.